United States Patent [19]

Zsifkovits et al.

[11] Patent Number: 4,931,362

[45] Date of Patent: Jun. 5, 1990

[54] MICROCAPSULE AND MICROMATRIX BODIES AND METHOD FOR THEIR FORMATION

[75] Inventors: Wilhelm Zsifkovits, Korneuburg, Austria; Burghard Grüning, Essen, Fed. Rep. of Germany; Hans-Joachim Kollmeier, Essen, Fed. Rep. of Germany; Dietmar Schaefer, Essen, Fed. Rep. of Germany; Christian Weitemeyer, Essen, Fed. Rep. of Germany

[73] Assignees: F.Joh.Kwizda Gesellschaft m.b.H., Vienna, Austria; TH. Goldschmidt AG, Essen, Fed. Rep. of Germany

[21] Appl. No.: 233,667

[22] Filed: Aug. 18, 1988

[30] Foreign Application Priority Data

Aug. 18, 1987 [AT] Austria ................................ 2072/87

[51] Int. Cl.$^5$ ............................................. B01J 13/02
[52] U.S. Cl. .................................. 428/402.22; 71/100; 71/DIG. 1; 252/610; 264/4.3; 264/4.33; 264/4.7; 424/408; 424/455; 424/462; 424/486; 428/402.21; 503/215; 514/963; 514/965
[58] Field of Search .............. 264/4.3, 4.33, 4.7; 428/402.21, 402.22; 424/408, 455, 462, 486; 514/963, 965

[56] References Cited

U.S. PATENT DOCUMENTS 3,551,346 12/1970 Breen et al. .......................... 264/4.7
3,730,905 5/1973 Koerner et al. ...................... 264/4.7
3,992,518 11/1976 Chien et al. ..................... 424/486 X
4,169,069 9/1979 Unger et al. .................... 424/486 X Primary Examiner—Richard D. Lovering Attorney, Agent, or Firm—Toren, McGeady & Associates

[57] ABSTRACT

An organic phase which comprises a water-insoluble material to be encapsulated, a capsule-forming or matrix-forming monomer or prepolymer and, should this be desirable, a solvent, is dispersed in droplet form in an aqueous phase. The capsule-forming or matrix-forming monomer or prepolymer forms a sheath around the material to be encapsulated. As a capsule-forming or matrix-forming monomer, an organosilicon compound of the general formula

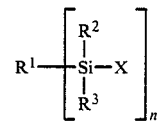

is used, wherein $R^1$ is a linear or branched, saturated or unsaturated, n-functional hydrocarbon moiety, which may be interrupted by groups containing oxygen, nitrogen or sulfur; $R^2$ and $R^3$ are the same or different and represent a hydrocarbon moiety with 1 to 6 carbon atoms or X; X is a hydroxyl group or a hydrolyzable group and n is a whole number greater than or equal to 1, with the proviso that, when $n=1$, $R^1$ has at least 12 carbon atoms and $R^2$ and $R^3$ represent X or a prepolymer hereof. The method can be carried out easily and requires only one compound to form the capsules or micromatrix bodies. In the implementation of the method, no foam occurs and the method results in end products with an acceptable shelf life.

26 Claims, No Drawings

MICROCAPSULE AND MICROMATRIX BODIES AND METHOD FOR THEIR FORMATION

The invention relates generally to microcapsules and micromatrix bodies. More particularly, the invention is directed to a method for the formation of such microcapsules or micromatrix bodies which contain a water-immiscible liquid phase, wherein an organic phase comprising (a) the water-insoluble material to be encapsulated, (b) a capsule- or matrix-forming monomer or prepolymer, and (c) if the need arises, a solvent is dispersed in droplet form in an aqueous phase, and wherein the capsule- or matrix-forming monomer or prepolymer forms a sheath around the material to be encapsulated.

The inventive method enables the preparation of small or extremely small capsules which enclose a hydrophobic liquid with a membrane or a thin wall and/or the formation of micromatrix bodies which contain a hydrophobic liquid.

BACKGROUND INFORMATION AND PRIOR ART

Such capsules or micromatrix bodies are used for a multitude of purposes. They serve to hold dyes, inks, chemical agents, pharmaceutically active substances, flavorings, fungicides, bactericides, herbicides, insecticides and other substances. These materials are located in the interior of the capsules or in the matrix body, optionally in dissolved, emulsified or suspended form. The enclosed material is protected by the sheath against the action of light, oxygen and moisture. The active ingredient can be released by diffusion or by mechanical destruction of the capsule wall or the matrix body.

Various methods are known for enveloping or encapsulating hydrophobic liquids. They are described in an easily surveyed form in the journal, Angewandte Chemie, 87, 556–567 (1975).

In most instances, the method of coacervation, as described for example, in Austrian Pat. Nos. 324,281 and 352,686, is used to form the capsules. This method involves the separation of a sol of one or several polymers into a polymer-rich liquid phase and a polymer-poor liquid phase. The coacervate appears first as a fine dispersion of microscopically small droplets of the polymer. If materials are present which are extraneous to the dispersion, the coacervate encloses these materials and encapsulates them. The enveloping polymer layer can then be solidified in a suitable manner.

Coacervation is a suitable method for encapsulating small amounts of substances. Since large volumes are required for the encapsulation, for example, 35 to 50 tons of reaction medium for 1 ton of pesticides, the method of coacervation of large amounts of substances is expensive and cumbersome and less suitable.

U.S. Pat. No. 3,557,515 discloses envelopment by interfacial polycondensation as a further method of encapsulation. In this method which may be carried out continuously, a first reaction participant and a reaction partner, complementary to the first reaction participant, are required. The two materials are present in different phases so that, after the formation of a dispersion, the two reaction partners react with one another at the phase boundary of the individual droplets. The droplets are then enveloped in this manner. It is difficult to control the reaction in this method and a high degree of technical effort and expenditure is required.

To avoid the necessity of two reaction partners, the production of such microcapsules from polyurea has been attempted. Pursuant to British Pat. No. 1 371 179, a polyisocyanate is thus mixed with the substance to be encapsulated with formation of an organic phase. Subsequently, this oily phase is emulsified in an aqueous phase. After obtaining an emulsion with the desired particle size of the emulsified phase, the interfacial polymerization, that is, the reaction of the isocyanate groups with water, is started by addition of a catalyst and/or by increasing the temperature. After the reaction, discrete capsules are present in the form of an aqueous suspension. This method has the disadvantage that carbon dioxide is evolved during the hydrolysis of the isocyanate which causes foaming of the reaction medium. Moreover, in the course of storage, carbon dioxide is gradually released from the unreacted, residual isocyanate groups, as a result of which the wrapping of the microcapsules produced in this manner may burst.

Pursuant to U.S. Pat. No. 4,406,741, it is possible to subject the microcapsules to an aftertreatment with ammonia or amines to reduce the content of residual isocyanate groups. However, this requires an additional step in the method which is not justifiable, especially for economic reasons.

In German Offenlegungsschrift No. 1 962 039, a further method is described for encapsulating particles of a phase dispersed in water by formation of a solidifiable boundary layer about the particles. In this method, surface active substances which contain at least one silyl group with at least one terminal hydrolyzable group linked to the silicon atom, are added during or after the preparation of the dispersion and the compounds, optionally in the presence of an alkoxysilane, are hydrolyzed and condensed. This method is suitable for stabilizing emulsions, especially silicone oil/water emulsions. However, it does not impart the enveloped oil droplets with sufficient stability to resist mechanical influences.

U.S. Pat. No. 3,946,106 discloses a method for the preparation of pharmaceutical formulations with a controlled release of the active ingredient. In this method, the active substance is dissolved in the desired concentration, generally up to the saturation limit, in an aqueous solution of polyethylene glycol. Subsequently, a silicone polymer which can be vulcanized at room temperature is added. This mixture is emulsified by vigorous stirring. After the addition of a suitable catalyst, the emulsion is filled into a silicone tube in which the vulcanization takes place within an hour. After removal of the silicone tube, the vulcanized material is present in the form of a string matrix which, by cutting off fragments of different lengths, contains different amounts of active ingredient.

In this method, no microcapsules are thus formed, but rather relatively large matrix bodies. These cannot be comminuted, let alone, sprayed.

There exist a large number of other publications which deal with this problem, but which do not go beyond the state of the art shown above.

OBJECTS OF THE INVENTION

It is the primary object of the present invention to provide a method for the formation of microcapsules or micromatrix bodies which can be carried out in a simple manner in the absence of foaming, permits the preparation of mechanically adequately stable capsules or matrix bodies and is suitable for implementation on an industrial scale, especially for the preparation of larger amounts of product.

Another object of the invention is to provide microcapsules or micromatrix bodies of the above indicated kind wherein the enveloping or encapsulating wall or membrane is formed from a single component and can be readily adjusted in respect to its release functions.

Generally, it is an object of the invention to improve on the art of microcapsules and micromatrix bodies and their formation.

SUMMARY OF THE INVENTION

Surprisingly, it has been ascertained that the above objects are superiorly accomplished by using as a capsule- or matrix-forming material, an organo-silicon compound of the general formula

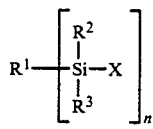

wherein $R^1$ is a linear or branched, saturated or unsaturated, n-functional hydrocarbon moiety which may be interrupted by groups containing oxygen, nitrogen or sulfur;

$R^2$, $R^3$ are the same or different and represent a hydrocarbon group with 1 to 6 carbon atoms or the X group;

X is a hydroxyl group or a hydrolyzable group, and n is a whole number equal to or greater than 1, with the proviso that when n=1, the $R^1$ moiety has at least 12 carbon atoms and $R^1$ and $R^2$ have the meaning of X.

The organosilicon compound is used in monomeric or prepolymeric form. The condensation of the organosilicon compound to form the encapsulation is carried out preferably in the presence of catalysts.

$R^1$ is an n-functional hydrocarbon group which may be linear or branched and saturated or unsaturated. The chain of this hydrocarbon group may be interrupted by oxygen, sulfur or nitrogen-containing groups. The molecular weight of the capsule-forming or matrix-forming monomer or prepolymer can be varied within a wide range. As long as the monomer or prepolymer is soluble in a suitable, water-immiscible solvent, no upper limits are set to the molecular weight. However, $R^1$ groups are preferred which have 2 to 14,000 carbon atoms. Especially preferred are $R^1$ groups with 2 to 1,000 carbon atoms and, more particularly, 2 to 250 carbon atoms.

Typical examples of suitable $R^1$ groups are $—C_{12}H_{22}$, $—(CH_2)_8—$,

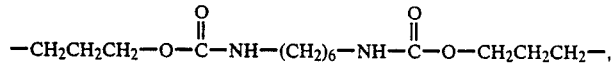

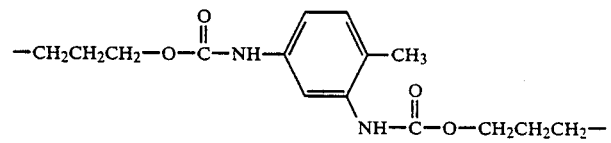

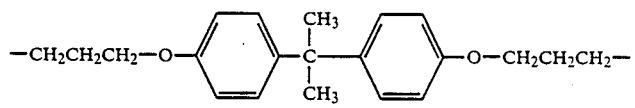

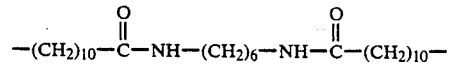

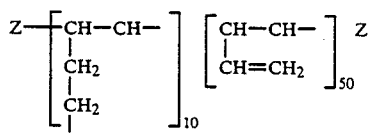

In the above, Z is a terminal group, such as $—H$, $CH_2CH_2CH=CH_2$, $—CH_2CH_2OH$, $—COOH$, $—CH_3$, $—C_4H_9$, $—C_6H_5$, $—CH_2C_6H_5$.

$R^2$ and $R^3$ are the same or different. They have the meaning of a hydrocarbon group with 1 to 6 carbon atoms, more particularly with 1 to 4 carbon atoms and preferably are methyl groups. They may also have the same meaning as X.

X is a hydroxyl group or a hydrolyzable group. As hydrolyzable groups, especially the alkoxy and acyloxy groups, come into consideration. Preferred alkoxy groups are those with 1 to 3 carbon atoms. The preferred acyloxy group is the acetoxy group. Halogens are also suitable as hydrolyzable groups. However, because of the hydrogen halide evolved during hydrolysis, these groups are not preferred.

n is a whole number, equal to or larger than 1. In the event that n=1, the condition must be fulfilled that the $R^1$ group has at least 12 carbon atoms. At the same time, $R^2$ and $R^3$ must have the same meaning as X.

Examples of suitable and, at the same time, preferred organosilicon compounds for the inventive method are those in which $R^1$ is an aliphatic hydrocarbon group with 8 or 10 carbon atoms, $R^2$ is methyl, methoxy or ethoxy, X is methoxy or ethoxy and n=2.

Furthermore, a modified polybutadiene with an average molecular weight of 3,000 is preferred as a monomer, with the proviso that 6 to 14% of the butadiene units carry $—Si(CH_3)(OCH_3)_2$, $—Si(CH_3)(OC_2H_5)_2$ or $—Si(OC_2H_5)_3$ groups or a modified polybutadiene with an average molecular weight of 1,000, with the proviso that 6 to 16% of the butadiene units carry the aforementioned groups. The silicon content of the organosilicon compounds advantageously falls within the range of 0.1 to 27% by weight. The silicon content determines the degree of cross linking of the capsule-forming polymer and thus determines the mechanical strength of the end product. Preferably, the silicon content lies between 2 and 27% by weight of the organosilicon compound.

In carrying out the inventive method, the water-immiscible substance, solution or dispersion to be encapsulated is mixed with the monomer or prepolymer in a ratio by weight of 98:2 to 1:99 and preferably of 95:5 to 50:50. The hydrophobic phase is then emulsified in the aqueous phase. Suitable emulsifiers or dispersants may be added to assist in the formation of the dispersion of the organic phase in the aqueous phase. For example, the aqueous phase may contain 0.05 to 1 parts by weight of surfactant, such as an ethoxylated fatty alcohol or an ethoxylated alkylphenol and 0.05 to 2 parts by weight of a protective colloid, such as polyvinyl alcohol, polyvinylpyrrolidone or a polysaccharide, such as a xanthan gum, the indicated amounts being based on 100 parts by weight of water. The hydropobic phase preferably constitutes 1 to 60% by weight of the total dispersion.

The size and uniformity of the capsules and micromatrix bodies obtained can be controlled by known methods which are normally employed when emulsifying one liquid in another. Any dispersing device which generates high shear forces can be employed in order to obtain the desired droplet size ranging from 0.5 to 4,000 $\mu$m. An example of such a device is an Ultra Turrax stirrer. The adjusted range depends on the intended purpose.

As soon as the desired droplet size is reached, the operation of the dispersing device is stopped. Gentle stirring suffices for the further course of the method. Vigorous stirring may be harmful during the condensation stage of the hydrolyzed organosilicon compounds.

It may be assumed that the halogen, acyloxy or alkoxy groups on the silicon atom are hydrolyzed in the presence of water. The SiOH groups thus formed then condense with the formation of Si-O-Si bonds. On the basis of these reactions, the monomers or polymers cross link to insoluble, high molecular weight polymeric products and enclose the substance to be encapsulated.

For controlling and accelerating capsule formation, the use of specific catalysts is recommended. Such catalysts are known from the art. Especially suitable are organotin salts, such as dibutyl tin dilaurate, or organic compounds of titanium or zirconium. Moreover, alkaline earth alkoxylates and acetylacetonates of aluminum, chromium, iron, cobalt or copper are usable. The catalysts may be added to the organic, water-immiscible phase. Surface active acids which may be added to the aqueous phase belong to a different type of preferred catalyst. Especially preferred examples of such acids are the alkylbenzenesulfonic acids, such as dodecylbenzenesulfonic acid. Other catalysts are listed in the book by W. Noll, "Chemie und Technologie der Silikone" (Chemistry and Technology of the Silicones), Verlag Chemie, 1968, page 181 ff.

The catalysts are employed preferably in amounts of 0.05 to 10 parts by weight per 100 parts of water-immiscible phase. The nature and properties of the enveloping material with respect to strength and penetratability can be influenced within wide ranges by the choice of the catalysts and the density of the cross-linkable silyl groups in the capsule- or matrix- forming material.

The reaction is completed after one hour to four days, depending on the nature of the catalyst. Discrete capsules or micromatrix bodies which are stable and do not lose their shape after drying can be observed under a microscope.

The inventive method is thus suited especially well for the preparation of microcapsules or micromatrix bodies; the use of several reaction partners to form the walls is avoided; there is no foaming of the reaction medium by evolved carbon dioxide and storable end products which are sufficiently stable mechanically are obtained.

Depending on the intended purpose, the capsules or micromatrix bodies can remain in the aqueous support phase at the end of the reaction leading to the formation of the capsule walls or the micromatrix bodies and the dispersion obtained can be used directly. If necessary, however, the capsules or micromatrix bodies can be separated from the aqueous phase by means of any conventional method, such as sedimentation, filtration or spray drying. To improve shelf life and facilitate use, additional materials, such as thickeners, biocides, surface active substances and dispersants, may be added.

The inclusion of active ingredients useful to control or combat plant diseases in microcapsules or micromatrix bodies is one way of achieving long-term control of diseases using compounds which generally are effective for only a short time. In the same way, herbicides, nematocides, insecticides, rodenticides and soil nutrients can be encapsulated with goods results. Chemicals for seed treatment were encapsulated likewise by means of the inventive method. Other biological products, such as anthelmintics, slimicides, algicides, swimming pool chemicals, miticides, acaricides, animal attractants, antiseptics, deodorants or disinfectants, may also be encapsulated.

The material to be encapsulated by the inventive method may be of any type provided that it is not miscible with water. The material may also be a combination of two or more different types of materials which are not miscible with water. A example of the use of a suitable, water-immiscible material is a combination of an active fungicide and an active insecticide. It is also conceivable to encapsulate a water-immiscible material which comprises an active component, such as a fungicide, and an inactive component, such as a solvent or an adjuvant. Solid material can be encapsulated by this method by forming a solution or dispersion of the solid material in a suitable solvent; by these means, a normally solid, water-immiscible material can be encapsulated.

The invention is described in greater detail in the following examples, it being understood that the examples are given by way of illustration and not by way of limitation.

EXAMPLE 1

12 g of a 66.7% by weight solution of a 1,2-polybutadiene with a molecular weight of 3,000, in which 14% of the butadiene units are modified by —Si(CH$_3$)(OC$_2$H$_5$)$_2$ groups, in Shellsol AB (an aromatic solvent mixture of mainly dimethylethyl- and tetramethylbenzene isomers) are mixed with 28 g Cypermethrin (RS)α-cyano-3-phenoxybenzyl-(1-RS)-cis,trans-3-(2,2-di-chlorovinyl)-2,2-dimethylcyclopropanecarboxylate, an insecticide) and heated to 50° C.

(water-immiscible phase). Moreover, an aqueous phase is prepared from 250 mL demineralized water, 1 g ethoxylated tridecyl alcohol (15 EO) and 60 g of a 2% aqueous xanthan gum solution. The solution of the insecticide is emulsified in the aqueous phase with the help of a disperser (such as Ultra Turrax T 45). When the emulsion reaches the desired degree of fineness of 3 to 50 μm, 20 mL of dodecylbenzenesulfonic acid solution (10% by volume in water) is added as catalyst. Within 2 hours, spherical particles, which also retain their shape after drying the water, can be seen under the microscope. After 24 hours, the pH is adjusted to a value of 4 with the help of 2N sodium hydroxide solution.

EXAMPLE 2

7 g of a 66.7% by weight solution of a 1,2-polybutadiene with a molecular weight of 3,000, in which 14% of the butadiene units have been modified by $-Si(CH_3)(OC_2H_5)_2$ groups, in Shellsol AB and 20 g Vernotlate (S-propyl-dipropylthiocarbamate a herbicide) are mixed at room temperature (water-immiscible phase). Moreover, an aqueous phase is prepared from 400 mL demineralized water, 1 g ethoxylated tridecylalcohol (15 EO) and 50 g of a 2% aqueous xanthan gum solution. The solution of the herbicide is emulsified in the aqueous phase with the help of a disperser (such as Ultra Turrax T 45) and 20 mL of dodecylbenzenesulfonic acid solution (10% by volume in water) are added to the dispersion as catalyst. After 24 hours, discrete capsules can be observed under the microscope.

EXAMPLE 3

In a solution (300 mL), prepared from 375 g of 2% aqueous xanthan gum solution. 1,500 mL demineralized water, 250 mL phosphate buffer of pH 7, 5 g ethoxylated tridecyl alcohol (8 EO) and 0.5 g of a defoamer, based on dimethylpolysiloxane and finely dispersed silica, a mixture of 53 g Chlorpyrifos (O,O-diethyl-O-(3,5,6-trichloro-2-pyridyl)-monothiophosphate, an insecticide), 13 g Shellsol AB, 15 g 1,8-bis(dimethoxymethylsilyl)-octane and 0.5 g dibutyl tin dilaurate as catalyst is emulsified with the help of a disperser. After 72 hours, discrete capsules can be recognized under the microscope. Within 10 days the disperse phase settles on the bottom, but can easily be redispersed by shaking.

EXAMPLE 4

The procedure of Example 3 is followed. However, the inner, water-immiscible phase is dispersed only very coarsely in the aqueous phase. Hard, water-clear spheres of a size of approximately 0.5 to 1.5 mm are obtained, which can easily be separated with the help of a sieve.

About 24 hours after isolation and drying at room temperature, turbidities appear in a portion of the spheres. Under the microscope, these can be identified as Chlorpyrifos crystals. Over a period of 8 to 10 days, all the spheres become cloudy and Chlorpyrifos crystals have deposited at their surface. If 25 g of 1,8-bis(dimethoxymethylsilyl)-octane are used instead of 15 g, the spheres remain clear longer and the Chlorpyrifos crystallizes more slowly.

The example shows that the biologically active material is released over a period of time, which can be varied as required.

EXAMPLE 5

To separate batches of a mixture of 200 mL demineralized water, 50 mL phosphate buffer of pH 5, 60 g of a 2% xanthan gum solution, 0.5 g ethoxylated tridecyl alcohol (15 EO) and 1 g defoamer is respectively added
(a) a mixture of 55 g Cypermethrin (technical grade, 90% AI), 33 g 1,10-bis-(dimethoxymethylsilyl)-decene and 1 g dibutyl tin dilaurate,
(b) a mixture of 55 g Cypermethrin (technical grade, 90% AI), 25 g 1,10-bis-(dimethoxymethylsilyl)-decene and 1 g dibutyl tin dilaurate,
(c) a mixture of 55 g Cypermethrin (technical grade, 90% AI), 18 g 1,10-bis-(dimethoxymethylsilyl)-decene and 1 g dibutyl tin dilaurate.

The mixtures are emulsified with the help of a disperser. After 72 hours, the samples are made up to 400 mL with demineralized water, so that a microcapsule suspension of 125 g Cypermethrin per liter results.

EXAMPLE 6

In a mixture of 260 mL demineralized water, 60 g of a 2% xanthan gum solution, 1 g ethoxylated tridecyl alcohol (15 EO) and 0.1 g defoamer, a solution of 200 g technical grade Cypermethrin, 100 g of a 50% solution of a 1,2-polybutadiene (with a molecular weight of 3,000), in which 6% of the butadiene units are modified with diethoxymethylsilyl groups, and 2 g dibutyl tin dilaurate is dispersed with a disperser. After 72 hours, discrete capsules can be observed under the microscope. The microcapsule suspension contains 50% (weight/volume) capsule mass and 33.3% (weight/volume) Cypermethrin. It can be concentrated to a 60% disperse phase by centrifuging and decanting the water.

EXAMPLE 7

In a mixture of 200 mL demineralized water, 50 g of a 2% xanthan gum solution, 1 g ethoxylated nonylphenol (10 EO) and 0.1 g defoamer, a solution of 25 g Cyphenotrin (R,S)α-cyano-3-phenoxybenzyl-(1RS)-cis,-trans-3-(2,2-dimethylvinyl-2,2-dimethylcyclopropanecarboxylate, an insecticide, and 10 g dodecyltrimethoxysilane is emulsified. When the desired particle size is reached, 10 mL of a 10% dodecylbenzenesulfonic acid solution in water is added. After about 3 hours, discrete capsules can be observed under the microscope.

EXAMPLE 8

8 g of a 66.7% solution of a polybutadiene with a molecular weight of 3,000, in which 9% of the butadiene units are modified by $-Si(OC_2H_5)_3$ groups, in Shellsol AB and 20 g Vernolate are mixed at room temperature (water-immiscible phase).

The aqueous phase is prepared from 400 mL demineralized water, 1 g ethoxylated tridecyl alcohol (15 EO) and 50 g of a 2% aqueous xanthan gum solution. The solution described above is emulsified in the aqueous phase with the help of a disperser (Ultra Turrax T 45). A 10% by volume solution of dodecylbenzenesulfonic acid solution in water (20 g) is added to this system. After 24 hours, discrete capsules can be observed under the microscope.

EXAMPLE 9

20 g of a 66.7% solution of a polybutadiene with a molecular weight of 3,000, in which 6% of the butadiene units are modified by —Si(CH$_3$)(OC$_2$H$_5$)$_2$ groups, in Shellsol AB and 65 g Trifluralin solution (50 g technical grade Trifluralin+15 g Shellsol AB, Trifluralin=α,α, α-trifluoro-2,6-dinitro-N,N-dipropyl-p-toluidine, a herbicide) are mixed (water-immiscible phase).

The aqueous phase is prepared from 160 mL demineralized water, 0.5 g ethoxylated tridecyl alcohol (15 EO) and 25 g of a 2% xanthan gum solution. The herbicide solution is emulsified in the aqueous phase. On reaching a fineness of 5 to 40 μm, 20 mL of dodecylbenzenesulfonic acid solution (10% by volume in water) are added. After 24 hours, discrete capsules, which retain their spherical shape even after the water evaporates on the microscope slide, can be observed under the microscope. About 2 hours after the water has evaporated, the crystallization of Trifluralin as yellow needles can be observed in individual capsules under the microscope. Within a period of a few days, the crystalline segregations can be observed in practically all capsules. As the example shows, not all of the biologically active substance is available immediately; rather, it is given off by the microscopic capsules over a prolonged period of time.

EXAMPLE 10

20 g of a 66.7% solution of a polybutadiene with a molecular weight of 3,000, in which 6% of the butadiene units are modified by —Si(CH$_3$)(OCH$_3$)$_2$ groups, in Shellsol AB and 65 g Trifluralin solution (50 g technical grade Trifluralin+15 g Shellsol AB) are mixed (water-immiscible phase).

The aqueous phase is prepared from 160 mL demineralized water, 0.5 g ethoxylated tridecyl alcohol (15 EO) and 25 g of a 2% xanthan gum solution. The above described solution is emulsified in this aqueous phase. On reaching a fineness of 5 to 40 μm, 20 mL of dodecylbenzenesulfonic acid solution (10% by volume in water) are added. After 24 hours, discrete capsules, which retain their spherical shape even after the water evaporates on the microscope slide, can be observed under the microscope.

EXAMPLE 11

A solution is prepared from 25 g dibutyl phthalate (a plasticizer) and 15 g of a 66.7% Shellsol AB solution of a 1,2-polybutadiene with a molecular weight of 3,000 in which 6% of the butadiene units are modified by —Si(CH$_3$)(OC$_2$H$_5$)$_2$ groups.

This solution is emulsified with a magnetic stirrer in a mixture of 30 g of a 2% aqueous xanthan gum solution, 0.5 g ethoxylated tridecyl alcohol (15 EO) and 10 ml dodecylbenzenesulfonic acid solution (10% by volume in water) in 300 mL demineralized water. The capsules formed have a diameter of 0.1 to 1.5 mm and can be isolated already after 1 hour. These capsules, which are highly elastic, give up their liquid content when crushed.

EXAMPLE 12

A solution is prepared from 25 g dibutyl phthalate (a plasticizer) and 15 g of a 66.7% Shellsol AB solution of a 1,2-polybutadiene with a molecular weight of 3,000, in which 14% of the butadiene units are modified by —Si(CH$_3$)(OC$_2$H$_5$)$_2$ groups.

This solution is emulsified with a magnetic stirrer in a mixture of 30 g of a 2% aqueous xanthan gum solution, 0.5 g ethoxylated tridecyl alcohol (15 EO) and 10 ml dodecylbenzenesulfonic acid solution (10% by volume in water) in 300 mL demineralized water. The capsules formed have a diameter of 0.1 to 1.5 mm and, after dilution of the capsule suspension (with about 2 L demineralized water), can easily be isolated by filtration through a suction filter.

EXAMPLE 13

A mixture is prepared from 25 g tris(β-chloroethyl)-phosphate (a flame retardant) and 10 g 2,2-bis(4-(3-dimethoxymethylsilylpropoxy)phenyl)propane.

This solution is emulsified with a magnetic stirrer in a mixture of 30 g of a 2% aqueous xanthan gum solution, 0.5 g ethoxylated tridecyl alcohol (15 EO) and 10 ml dodecylbenzenesulfonic acid solution (10% by volume in water) in 300 mL demineralized water. The capsules formed have a diameter of 0.1 to 1.5 mm and, after dilution of the capsule suspension (with about 2 L demineralized water), can easily be isolated by filtration through a suction filter.

EXAMPLE 14

A solution is prepared from 15 g dibutyl phthalate (a plasticizer), 5 g bis-(dimethoxymethylsilyl)-ethane and 0.2 g dibutyl tin dilaurate.

This solution is emulsified with a magnetic stirrer in a mixture of 30 g of a 2% aqueous xanthan gum solution and 0.5 g ethoxylated tridecyl alcohol (15 EO) in 300 mL demineralized water. After 24 hours, discrete particles with a diameter of 50 to 500 μm can be observed under the microscope. These particles retain a spherical structure even after the water has evaporated from the microscope slide.

EXAMPLE 15

A solution is prepared from 25 g tris(β-bromomethyl)-phosphate (a flame retardant) and 10 g 2,2-bis(4-(3-dimethoxymethylsilylpropoxy)phenyl)propane and 2.5 g titanium tetraisopropylate.

This solution is emulsified with a magnetic stirrer in a mixture of 30 g of a 2% aqueous xanthan gum solution, 0.5 g ethoxylated tridecyl alcohol (15 EO) and 10 ml dodecylbenzenesulfonic acid solution (10% by volume in water) in 300 mL demineralized water.

The capsules formed have a diameter of 0.1 to 1.5 mm and, after dilution of the capsule suspension with about 2 L demineralized water, can easily be isolated by filtration through a suction filter.

EXAMPLE 16

A solution is prepared from 25 g dioctyl phthalate (a plasticizer) and 10 g toluylene-2,4-di-3-dimethoxymethylsilylpropyl carbamate.

This solution is emulsified with a magnetic stirrer in a mixture of 30 g of a 2% aqueous xanthan gum solution, 0.5 g ethoxylated tridecyl alcohol (15 EO) and 10 mL dodecylbenzenesulfonic acid solution (10% by volume in water) in 300 mL demineralized water.

The capsules formed have a diameter of 0.1 to 1.5 mm and, after dilution of the capsule suspension with about 2 L demineralized water, can easily be isolated by filtration through a suction filter.

EXAMPLE 17

A solution is prepared from 25 g dioctyl phthalate (a plasticizer) and 10 g 1,6-hexylene-di-3-dimethoxysilyl-propylcarbamate.

This solution is emulsified with a magnetic stirrer in a mixture of 30 g of a 2% aqueous xanthan gum solution, 0.5 g ethoxylated tridecyl alcohol (15 EO) and 10 ml dodecylbenzenesulfonic acid solution (10% by volume in water) in 300 mL demineralized water.

Within an hour, capsules have formed, which have a diameter of 0.1 to 2.0 mm and can easily be isolated by filtering through a sieve.

EXAMPLE 18

A solution is prepared from 30 g dibutyl phthalate and 10 g of a 67% Shellsol AB solution of a 1,2-polybutadiene with a molecular weight of 3,000, in which 6% of the butadiene units have been modified by

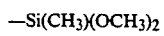
—Si(CH$_3$)(OCH$_3$)$_2$ groups, and 2.8 g of titanium tetraisopropylate are added.

This solution is emulsified with an impeller stirrer in a mixture of 300 mL demineralized water, 30 g of a 2% xanthan gum solution in water and 0.1 g ethoxylated tridecyl alcohol (8 EO).

Rapid formation of capsules takes place. These have a diameter of 0.1 to 3.0 mm and, after dilution of the suspension, can easily be filtered off with the help of a suction filter.

EXAMPLE 19

A solution is prepared from 275 g industrial grade Vernolate and 40 g of a 1,2-polybutadiene with a molecular weight of 1,000, in which 16% of the butadiene units are modified with methyldiethoxysilyl groups.

This solution is emulsified with the help of an Ultra Turrax T 45 in a mixture of 400 mL demineralized water, 100 g of a 2% xanthan gum solution and 2 g ethoxylated tridecyl alcohol (15 EO). When an emulsion fineness of 5 to 30 um is reached, 40 mL of a 10% dodecylbenzenesulfonic acid solution are stirred in with an impeller stirrer. After 6 hours, the pH of the capsule suspension is adjusted with 2N sodium hydroxide solution to a value of 6. Under the microscope, discrete capsules can be observed. This suspension of capsules is diluted with demineralized water to 1 L, so that it contains 240 g/L of S-propyl-dipropylthiocarbamate.

This finished suspension of microcapsules can be applied readily with the usual agricultural field spraying equipment.

EXAMPLE 20

A solution is prepared from 275 g industrial grade Vernolate and 60 g of a 1.2-polybutadiene with a molecular weight of 1,000, in which 16% of the butadiene units are modified with methyldiethoxysilyl groups.

The further steps of the method are similar to those already described in Example 19 and produced the same results.

Example 21

A 33% Shellsol AB solution (14 g) of a 1,2-polybutadiene with a molecular weight $\geq$ 100,000, in which 2% of the butadiene units are modified by —SiCH$_3$(OC$_2$H$_5$) groups, and 15 g Vernolathe are mixed at room temperature (water immiscible phase). Furthermore, an aqueous phase is prepared from 400 mL demineralized water, 1 g ethoxylated tridecyl alcohol (15 EO) and 50 g of a 2% aqueous xanthan gum solution. The solution of the herbicide is emulsified with an Ultra Turrax in the aqueous phase and 20 mL of dodecylbenzenesulfonic acid solution (10% by volume in water) are added. After 24 hours, discrete capsules can be observed under the microscope.

EXAMPLE 22

A mixture of 10 g of a 1,2-polybutadiene, in which 5% of the butadiene units are modified by —SiCH$_3$Cl$_2$ groups, and 10 g cyclohexane are emulsified with the help of a magnetic stirrer in 150 mL water, which contains 1.5 g ethoxylated nonylphenol (10 EO).

Capsule formation takes place spontaneously. The formation of a thin sheath can be observed under the microscope. As soon as the stirring is stopped, the capsules coagulate, however, without fusing.

EXAMPLE 23

A mixture of 10 g of a 1,2-polybutadiene, in which 25% of the butadiene units are modified by —SiCH$_3$Cl$_2$ groups, and 10 g cyclohexane are emulsified with the help of a magnetic stirrer in 150 mL water, which contains 1.5 g ethoxylated nonylphenol (10 EO).

Capsule formation takes place spontaneously. The capsules coagulate immediately. It can be seen under the microscope that the small spheres adhere to one another without losing their primary structure. They can easily be crushed between a microscope slide and a cover slip.

EXAMPLE 24

A mixture of 2-(1-methylheptyl)-4,6-dinitrophenyl crotonate. 5 g cyclohexane, 0.5 g dibutyl tin dilaurate and 15 g of a 1,2-polybutadiene, in which 5% of the butadiene units are modified by SiCH$_3$Cl$_2$ groups is emulsified with an Ultra Turrax T45 in a phosphate buffer solution of pH 8.2 (100 mL). which contains 1 g of ethoxylated nonylphenol phosphate ester as emulsifier Capsule formation takes place spontaneously. In some cases torpedo-shaped capsules can be observed under the microscope.

EXAMPLE 25

The following experiment was carried out to confirm the long-term effect of active ingredient, encapsulated pursuant to the invention, relative to the effect of active ingredient that has not been encapsulated.

One of two Heraklith plates (1×0.5 m), which were finished with a plaster (pH 11.5), was treated with the experimental formulation 5c, the other with a Cypermethrin emulsion concentrate. In each case 20 mg of active ingredient were used per plate (0.5 m$^2$). The formulation of active ingredient that had been applied was dried and the treated plates were covered with Plexiglas hoods (95×45×60 cm). In each case, between 10 and 30 houseflies (*Musca domestica*) were then let in. After 24 hours, the percentage of dead flies was determined, dead and living flies were removed and fresh experimental insects were let in once again. It was observed that the effect of the Cypermethrin emulsion concentrate had declined. On the other hand, the inventive capsule suspension still showed 80% of the original activity after 4 days, 50% after 6 days and 25% after 14 days. The alkali-sensitive active ingredient, Cypermethrin, is thus well protected against destruction by the inventive encapsulation method.

EXAMPLE 26

Encapsulation of a Dye-Forming Mixture

A solution is prepared by slightly warming 12 g chlorinated paraffin (52% Cl). 12 g xylene. 0.6 g crystal violet lactone and 0.2 g benzoyl lencomethylene blue. This is mixed with 7.5 g of a 1,2-polybutadiene of molecular weight 1,000, in which 16% of the butadiene units are modified with methyldiethoxysilyl groups, and 2 g of dibutyl tin dilaurate.

The solution, so obtained, is emulsified with the help of an Ultra Turrax T 45 in a mixture of 100 mL demineralized water, 30 g of a 2% xanthan gum solution and 0.25 g ethoxylated tridecyl alcohol (15 EO). After an emulsion fineness of 5 to 20 μm is reached, slow stirring is continued for a further 3 hours with an impeller stirrer. Discrete capsules can be observed under the microscope.

A portion of the suspension is applied on a sheet of paper to form a layer 150 μm thick. On a different sheet of paper, the same thickness of a suspension of 20 g of activated bleaching earth. 2 g of hydroxyethylcellulose and 78 g of water is applied. The papers are dried and placed on top of one another in some suitable manner. A very suitable carbon-less copy paper is obtained.

What is claimed is:

1. A method of forming microcapsules or micromatrix bodies having an interior water-immiscible liquid phase containing an active, water-immiscible ingredient, said method comprising:
   (a) dispersing in droplet form an organic phase containing said active ingredient and a component capable of forming a capsule or matrix sheath in an aqueous phase;
   (b) said component being an organosilicon compound of the general formula

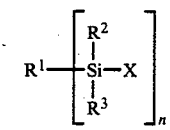

wherein
   $R^2$ is selected from the group consisting of linear, branched, saturated and unsaturated, n-functional hydrocarbon groups having 2 to 14,000 carbon atoms and such groups interrupted by groups containing oxygen, nitrogen or sulfur;
   $R^2$, $R^3$ are the same or different and represent a hydrocarbon group with 1 to 6 carbon atoms or the X groups;
   X is hydroxyl or a hydrolyzable group, and $n \geq 2$, and
   (c) condensing said component to form a cross-linked polymer constituting said capsule or matrix sheath.
2. The method of claim 1, wherein said organic phase contains a solvent.

3. The method of claims 1 or 2, wherein the condensation is carried out in the presence of a catalyst.
4. The method of claim 3, wherein surface active organic acids or organic compounds of tin and titanium are used as condensation catalysts.
5. The method of claims 1 or 2, wherein said organosilicon compound is employed in monomeric or prepolymeric form.
6. The method of claim 4, wherein the monomer or prepolymer is contained in the hydrophobic phase in an amount of 5 to 95% by weight, based on the hydrophobic phase, the hydrophobic phase constituting 1 to 60% by volume of the total dispersion.
7. The method of claims 1 or 2, wherein $R^1$ has 2 to 1,000 carbon atoms.
8. The method of claims 1 or 2, wherein $R^1$ has 2 to 250 carbon atoms.
9. The method of claims 1 or 2, wherein $R^1$ is an aliphatic hydrocarbon group with 8 or 10 carbon atoms, $R^2$ is methyl, methoxy or ethoxy, $R^3$ is methoxy or ethoxy, X is methoxy or ethoxy and $n=2$.
10. The method of claims 1 or 2, wherein said hydrolyzable group is alkoxy, acyloxy or halogen.
11. The method of claims 1 or 2, wherein the Si-content of said compound is between about 0.1 to 27% by weight.
12. The method of claims 1 or 2, wherein the weight ratio of said active ingredient to the compound is between about 98:2 to 1:99.
13. The method of claims 1 or 2, wherein the weight ratio of said active ingredient to said compound is between about 95:5 to 50:50.
14. The method of claims 1 or 2, wherein step (a) is carried out with the aid of a dispersing device generating shear forces.
15. A method of forming microcapsules or micromatrix bodies having an interior water-immiscible liquid phase containing an active, water-immiscible ingredient, said method comprising:
   (a) dispersing in droplet form an organic phase containing said active ingredient and a component capable of forming a capsule or matrix sheath in an aqueous phase;
   (b) said component being a modified polybutadiene of average molecular weight 3,000, in which 6 to 14% of the butadiene units carry —Si(CH$_3$)(OCH$_3$)$_2$, —Si(CH$_3$) (OC$_2$H$_5$)$_2$ or —Si(OC$_2$H$_5$)$_3$ groups; and
   (c) condensing said component to form a cross-linked polymer constituting said capsule or matrix sheath.
16. A method of forming microcapsules or micromatrix bodies having an interior water-immiscible liquid phase containing an active, water-immiscible ingredient, said method comprising:
   (a) dispersing in droplet form an organic phase containing said active ingredient and a compound capable of forming a capsule or matrix sheath in an aqueous phase;
   (b) said component being a modified butadiene of average molecular weight 1,000, in which 6 to 16% of the butadiene groups carry —Si(CH$_3$)(OCH$_3$)$_2$, —Si(CH$_3$)(OC$_2$H$_5$)$_2$ or —Si(OC$_2$H$_5$)$_3$ groups; and
   (c) condensing said component to form a cross-linked polymer constituting said capsule or matrix sheath.
17. In a microcapsule or micromatrix body wherein a water-immiscible active ingredient is encapsulated or sheathed by a membrane wall, the improvement which comprises that the membrane wall is a polymer formed by the condensation and cross-linking of an organosilicon compound of the general formula

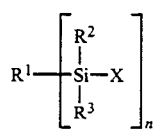

wherein
R[1] is selected from the group consisting of linear, branched, saturated and unsaturated, n-functional hydrocarbon groups having 2 to 14,000 carbon atoms and such groups interrupted by groups containing oxygen, nitrogen or sulfur;
R[2], R[3] are the same or different and represent a hydrocarbon group with 1 to 6 carbon atoms or the X groups;
X is hydroxyl or a hydrolyzable group, and $n \geq 2$.

18. The microcapsule or micromatrix body of claim 17, wherein R[1] has 2 to 1,000 carbon atoms.

19. The microcapsule or micromatrix body of claim 17, wherein R[1] has 2 to 250 carbon atoms.

20. The microcapsule or micromatrix body of claim 17, wherein R[1] is an aliphatic hydrocarbon group with 8 or 10 carbon atoms, R[2] is methyl, methoxy or ethoxy, R[3] is methoxy or ethoxy, X is methoxy or ethoxy and $n=2$.

21. The microcapsule or micromatrix body of claim 20, wherein said hydrolyzable group is alkoxy, acyloxy or halogen.

22. The microcapsule or micromatrix body of claim 17, wherein the Si-content of said compound is between about 0.1 to 27% by weight.

23. The microcapsule or micromatrix body of claim 17, wherein the weight ratio of said active ingredient to the compound is between about 98:2 to 1:99.

24. The microcapsule or micromatrix body of claim 17, wherein the weight ratio of said active ingredient to said compound is between about 95:5 to 50:50.

25. In a microcapsule or micromatrix body wherein a water-immiscible active ingredient is encapsulated or sheathed by a membrane wall, the improvement which comprises that the membrane wall is a polymer formed by the condensation and cross-linking of a modified polybutadiene of average molecular weight 3,000, in which 6 to 14% of the butadiene units carry —Si(CH$_3$)(OCH$_3$)$_2$; —Si(CH$_3$)(OC$_2$H$_5$)$_2$ or —Si(OC$_2$H$_5$)$_3$ groups.

26. In a microcapsule or micromatrix body wherein a water-immiscible active ingredient is encapsulated or sheathed by a membrane wall, the improvement which comprises that the membrane wall is a polymer formed by the condensation and cross-linking of a modified butadiene of average molecular weight 1,000, in which 6 to 16% of the butadiene groups carry —Si(CH$_3$)(OCH$_3$)$_2$, —Si(CH$_3$)(OC$_2$H$_5$)$_2$ or —Si(OC$_2$H$_5$)$_3$ groups.

* * * * *